US008733972B2

(12) United States Patent
Ha

(10) Patent No.: US 8,733,972 B2

(45) Date of Patent: May 27, 2014

(54) LIGHTING APPARATUS

(75) Inventor: Young Soo Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 640 days.

(21) Appl. No.: 12/968,785

(22) Filed: Dec. 15, 2010

(65) Prior Publication Data

US 2011/0141739 A1 Jun. 16, 2011

(30) Foreign Application Priority Data

Dec. 15, 2009 (KR) ........................ 10-2009-0124892

(51) Int. Cl.
*G02B 6/00* (2006.01)

(52) U.S. Cl.
USPC ....... 362/249.02; 362/235; 362/652; 362/800

(58) Field of Classification Search
CPC .......... F21Y 2101/02; F21Y 2105/008; G02B 6/0011; H01L 29/7869; F21K 9/135; F21S 8/026; F21S 8/04
USPC ............ 362/249.02, 604, 605, 611, 612, 555, 362/545, 800, 23.07, 559, 812, 235; 463/31, 20; 257/43, 98; 250/208.1; 29/423, 592.1; 349/96
See application file for complete search history.

(56) References Cited

U.S. PATENT DOCUMENTS

2004/0252501 A1 * 12/2004 Moriyama et al. ............ 362/238

* cited by examiner

*Primary Examiner* — Jason Moon Han
*Assistant Examiner* — Danielle Allen
(74) *Attorney, Agent, or Firm* — Ked & Associates, LLP

(57) ABSTRACT

Disclosed herein is a lighting apparatus in which a plurality of lighting blocks is inserted into a base member at positions desired by a user so as to improve the aesthetics of the lighting apparatus and enable easy repair and replacement.

9 Claims, 10 Drawing Sheets

LIGHTING APPARATUS

This application claims the benefit of Korean Patent Application No. 10-2009-0124892, filed on Dec. 15, 2009, which is hereby incorporated in its entirety by reference as if fully set forth herein.

BACKGROUND OF THE INVENTION

1. Field of the Invention

The present invention relates to a lighting apparatus.

2. Discussion of the Related Art

The lighting industry has played a key role in advance in human culture and has been closely connected to the advancement of the human race since the dawn of time.

Recently, advances in the lighting industry have progressed at a vigorous pace and numerous studies related to light sources, light emitting methods, driving methods and efficiency enhancement have been conducted.

Examples of current light sources used in lighting apparatuses include incandescent bulbs, fluorescent lamps and discharge lamps. These light sources have been used for a variety of purposes, such as domestic, industrial, and outdoor purposes.

However, light sources operating based upon electrical resistance, such as incandescent bulbs, etc., have problems of low efficiency and high heat loss, discharge lamps are expensive and exhibit poor energy efficiency, and fluorescent lamps have a problem of environmental pollution due to use of mercury.

To solve disadvantages of these light sources, interest in light emitting diodes, which have a great number of advantages, such as high efficiency and realization of various colors and designs, etc., is increasing.

In particular, demand for a surface light source having more uniform optical characteristics than point/linear light sources is increasing.

SUMMARY OF THE INVENTION

Accordingly, the present invention is directed to a lighting apparatus.

An object of the present invention is to provide a lighting apparatus in which a plurality of lighting blocks is inserted into a base member at desired positions so as to improve the aesthetics of the lighting apparatus.

Another object of the present invention is to provide a lighting apparatus in which lighting blocks are easily repaired and replaced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a lighting apparatus includes at least one lighting block having receptacles, and a base member including a plurality of connectors detachably and electrically connected with the receptacles and an electronic module to supply power to the at least one lighting block through one receptacle and one connector under the condition that the corresponding receptacle and connector are connected.

In another aspect of the present invention, a lighting apparatus includes at least one lighting block having first and second receptacles, and a base member including a plurality of first and second connectors detachably and electrically connected with the respective receptacles and an electronic module to supply power to the at least one lighting block through the receptacles and the connectors under the condition that the receptacles and the corresponding connectors are respectively connected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

In the following detailed description, reference is made to the accompanying drawings which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
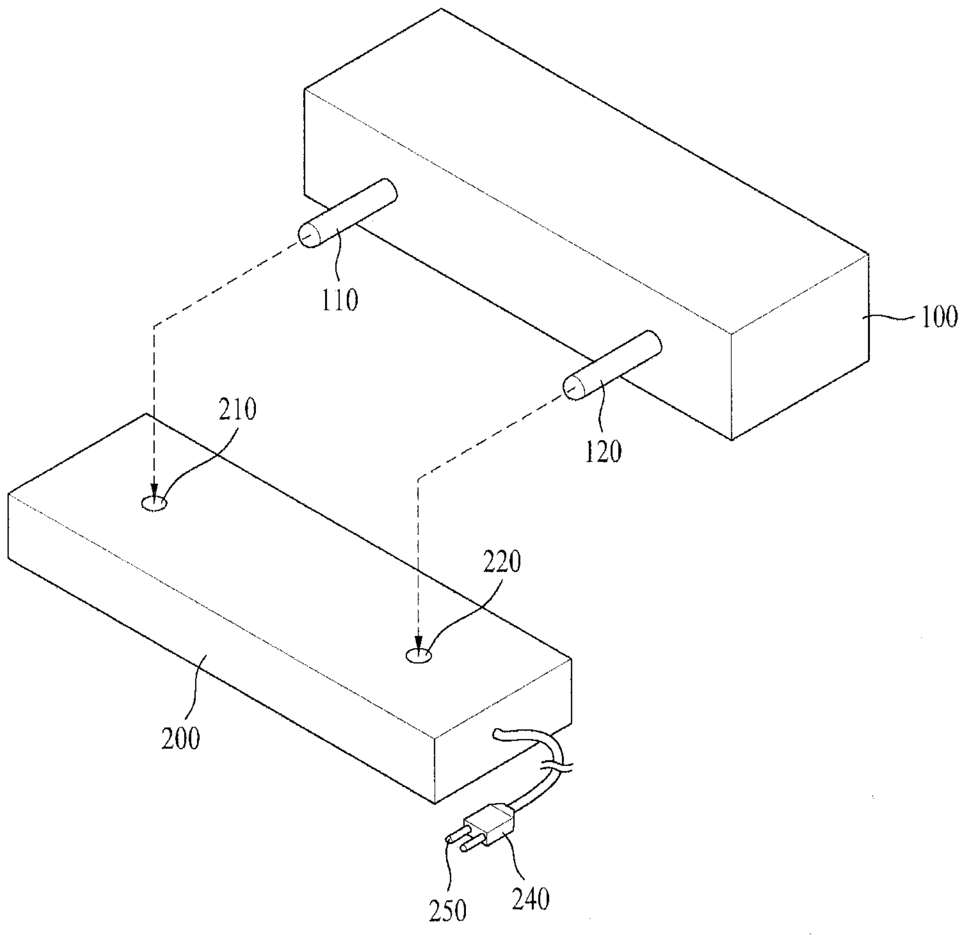
FIG. 1 is a schematic perspective view illustrating a lighting apparatus in accordance with one embodiment of the present invention.
Figure 2:
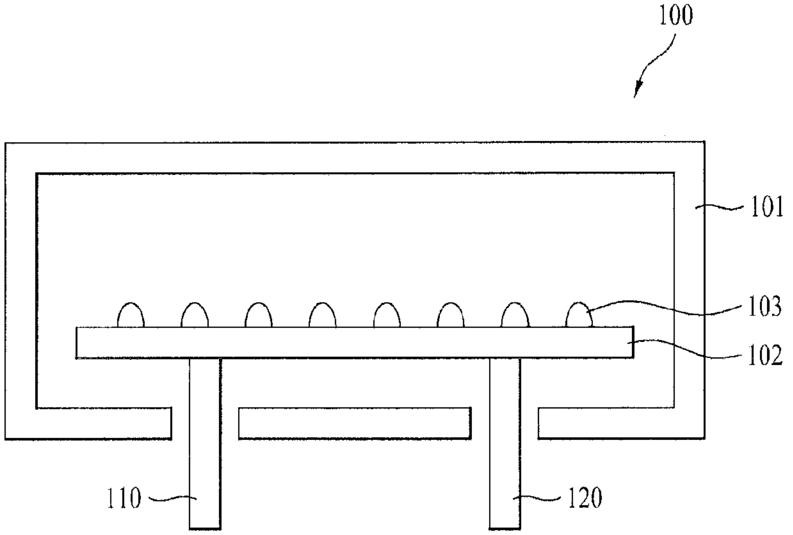
FIG. 2 is a cross-sectional view of a lighting block in accordance with the present invention.

FIG. 1 is a schematic perspective view illustrating a lighting apparatus in accordance with one embodiment of the present invention, and FIG. 2 is a cross-sectional view of a lighting block in accordance with the present invention.

Figure 3:
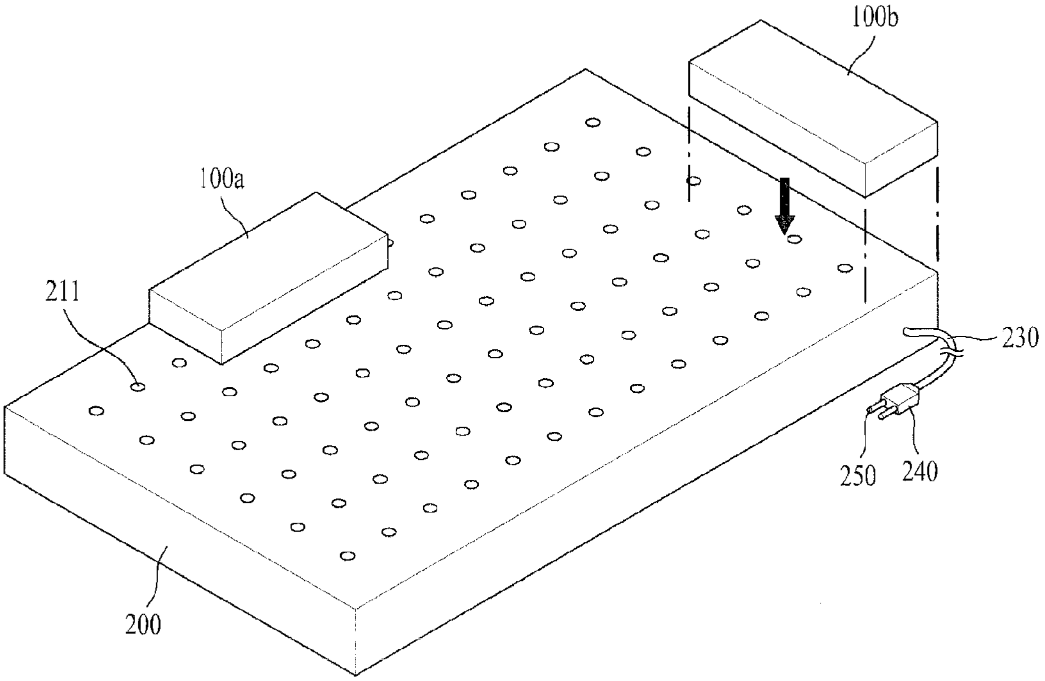
FIG. 3 is a schematic perspective view illustrating a lighting apparatus in accordance with a first embodiment of the present invention.
Figure 4:
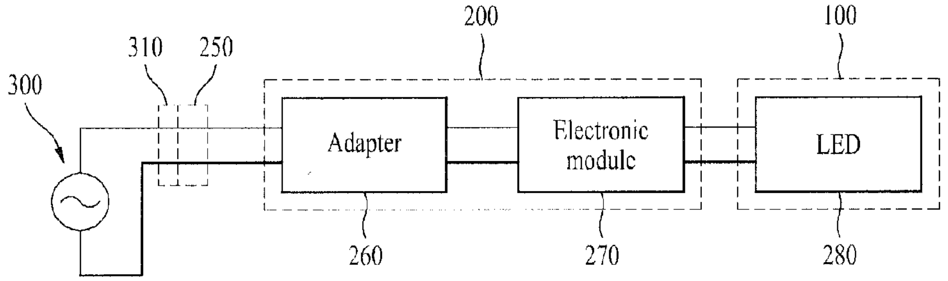
FIG. 4 is a schematic block diagram illustrating a configuration of the lighting apparatus in accordance with the first embodiment of the present invention.
Figure 5:
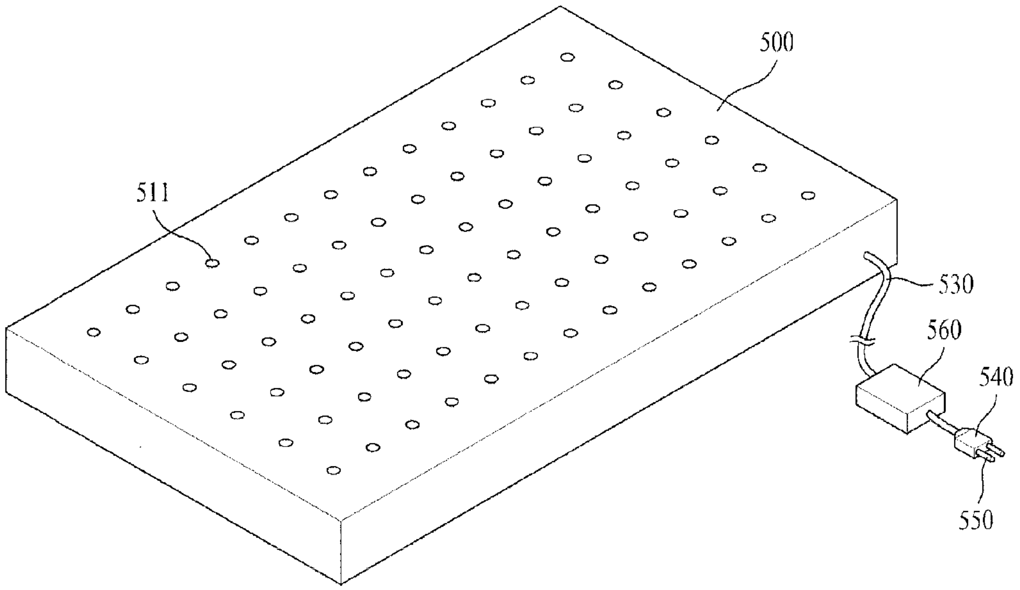
FIG. 5 is a schematic perspective view illustrating the lighting apparatus in accordance with the first embodiment of the present invention.
Figure 6:
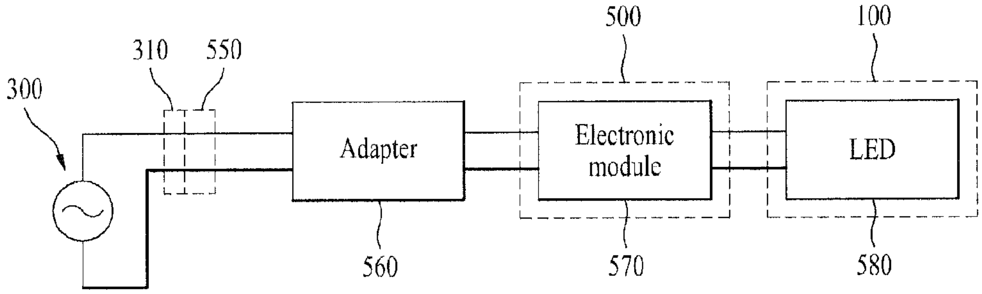
FIG. 6 is a schematic block diagram illustrating another configuration of the lighting apparatus in accordance with the first embodiment of the present invention.

FIG. 3 is a schematic perspective view illustrating a lighting apparatus in accordance with a first embodiment of the present invention, FIG. 4 is a schematic block diagram illustrating a configuration of the lighting apparatus in accordance with the first embodiment of the present invention, and FIG. 5 is a schematic perspective view illustrating the lighting apparatus in accordance with the first embodiment of the present invention.

A lighting apparatus in accordance with one embodiment of the present invention includes at least one lighting block 100 having receptacles 110 and 120, and a base member 200 including a plurality of connectors 210 and 220 detachably and electrically connected with the receptacles 110 and 120 and an electronic module 270 to supply power to the at least one lighting block 100 through the receptacle 110 and any one connector 210 under the condition that the receptacle 110 and the corresponding connector 210 are connected.

With reference to FIG. 1, the respective connectors 210 and 220 are provided on one surface of the base member 200 at a designated interval in the horizontal direction or the vertical direction, and the connectors 210 and 220 include recesses 211.

With reference to FIG. 3, the recesses 211 are provided on one surface of the base member 200 at designated intervals in the horizontal direction or the vertical direction.

With reference to FIG. 2, the lighting block 100 includes a housing 101, a substrate 102 disposed within the housing 101, and at least one light emitting diode (LED) 103 mounted on the substrate 102. The receptacles 110 and 120 are electrically connected to the substrate 102.

The receptacles 110 and 120 include first and second rod parts 110 and 120 protruded to the outside of the housing 101 so as to be inserted into the recesses 211.

Further, the first rod part 110 alone may be electrically connected to the substrate 102.

The lighting apparatus in accordance with this embodiment of the present invention further includes an adapter 260 (with reference to 560 of FIG. 5) located at a position separated from the base member 200 by a designated interval and electrically connected to the electronic module 270, and a plug 240 electrically connected to the adapter 260.

The adapter 260 may be provided within the base member 200.

In the lighting block 100, when the first rod part 110 is electrically connected to one connector 211 under the condition that the first rod part 110 is inserted into the connector 211, the LEDs 103 are driven under the control of the electronic module 270.

A pin 250 of the plug 240 is inserted into a socket 310 of a commercial power source 300, and power is supplied to the electronic module 270 of the lighting apparatus through the pin 250.

FIG. 3 is a schematic perspective view illustrating the lighting apparatus in accordance with the first embodiment of the present invention.

The lighting apparatus in accordance with the present invention may be implemented in a Lego type in which a plurality of lighting blocks 100*a* and 100*b* is freely inserted into the base member 200.

That is, a Lego type lighting apparatus includes a plurality of lighting blocks 100*a* and 100*b*, each of which includes LEDs 103 and a rod part 110, and a base member 200 including recesses 211 electrically connected with the rod parts 110 of the lighting blocks 100*a* and 100*b* such that the rod parts 110 are inserted into the recesses 211 and an electronic module 270 to control the LEDs 103.

In such a Lego type lighting apparatus, when the plural lighting blocks 100*a* and 100*b* are inserted into the base member 200, the LEDs 103 of the respective lighting blocks 100*a* and 100*b* are driven.

Here, the number of the recesses 211 of the base member 200 is greater than the number of the respective rod parts 110 of the plural lighting blocks 100*a* and 100*b*, and thus the respective lighting blocks 100*a* and 100*b* may be freely inserted into the base member 200.

If the total number of the rod parts 100 of the plural lighting blocks 100*a* and 100*b* is equal to the number of the recesses 211 of the base member 200, the plural lighting blocks 100*a* and 100*b* may be inserted into the base member 200 in the same manner as Lego blocks, thereby forming the lighting apparatus.

Figure 7A:
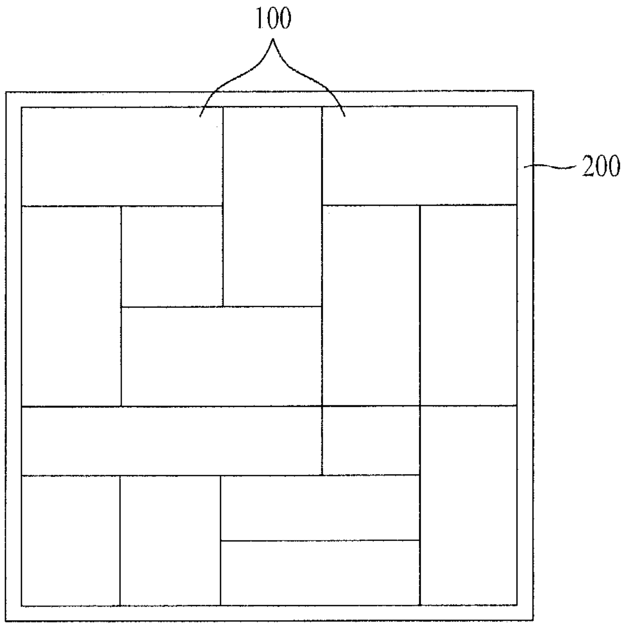
FIGS. 7A and 7B are schematic views illustrating assembly states of a base member of the lighting apparatus in accordance with the present invention.
Figure 7B:
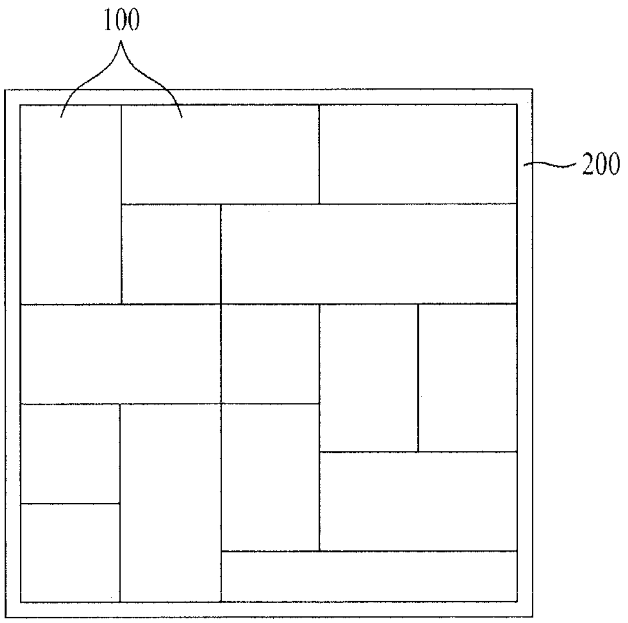
Figure 8:
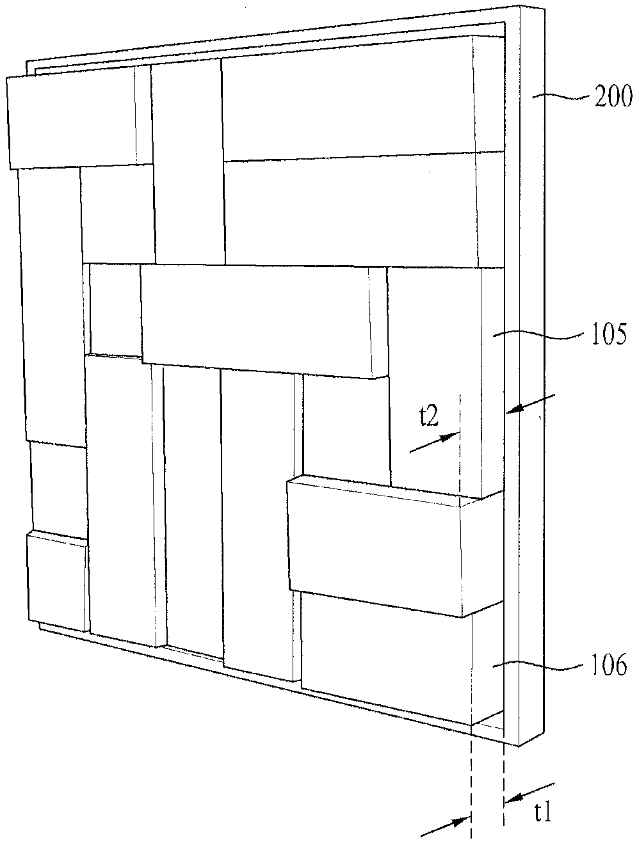
FIG. 8 is a perspective view illustrating another assembly state of the base member of the lighting apparatus in accordance with the present invention.

FIG. 5 is a schematic perspective view illustrating the lighting apparatus in accordance with the first embodiment of the present invention, FIGS. 7A and 7B are schematic views illustrating assembly states of a base member of the lighting apparatus in accordance with the present invention, and FIG. 8 is a perspective view illustrating another assembly state of the base member of the lighting apparatus in accordance with the present invention.

For example, states in which the lighting blocks 100 are inserted into the base member 200 in the same manner as Lego blocks, as shown in FIGS. 7A and 7B, are different. That is, disposition states of the lighting blocks 100 on the base member 200 in FIGS. 7A and 7B are different.

Therefore, the lighting apparatus in accordance with the present invention is advantageous in that the plural lighting blocks 100*a* and 100*b* may be inserted into the base member 200 according to user's preferences.

With reference to FIG. 4, both the electronic module 270 and the adapter 260 are installed within the base member 200.

Further, when the plug 240 is inserted into the socket 310 so as to be connected to the commercial power source 300 and the lighting blocks 100 are inserted into the base member 200, the lighting apparatus performs lighting.

With reference to FIG. 5, an electronic module 570 alone is installed within the base member 500, and an adapter 560 and a plug 560 are connected to the base member 500 by a wire 530.

With reference to FIG. 8, plural lighting blocks 105 and 106 which are inserted into the base member 200 have different thicknesses, thereby providing a three-dimensional effect.

That is, in FIG. 8, a thickness t2 of the lighting block 105 is greater than a thickness t1 of the lighting block 106.

Figure 9:
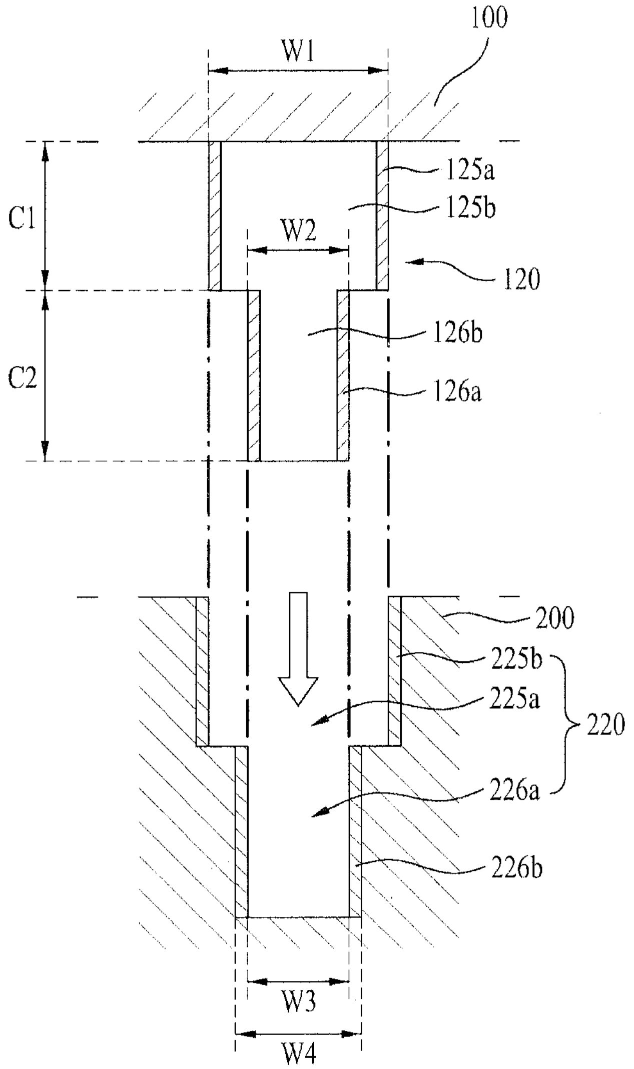
FIGS. 9 and 10 are cross-sectional views illustrating insertion of the lighting block into the base member of the lighting apparatus in accordance with the present invention.
Figure 10:
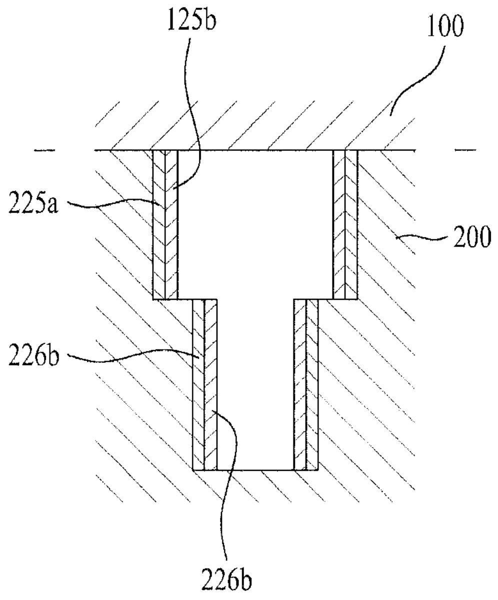
Figure 11:
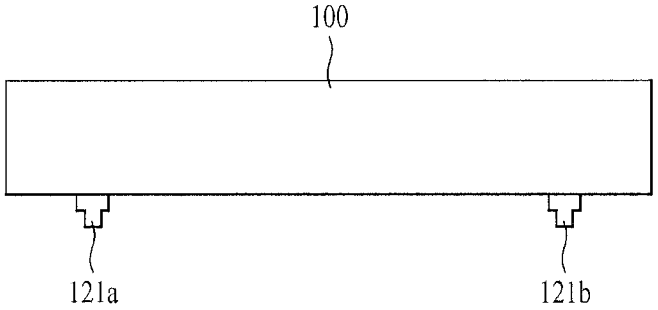
FIG. 11 is a schematic cross-sectional view of the lighting block in accordance with the present invention.

FIGS. 9 and 10 are cross-sectional views illustrating insertion of the lighting block into the base member of the lighting apparatus in accordance with the present invention, and FIG. 11 is a schematic cross-sectional view of the lighting block in accordance with the present invention.

That is, each of the respective rod parts 110 and 120 of the lighting block 100 includes a first connection part 125*a* having a first diameter W1 and a second connection part 126*a* connected to the first connection part 125*a* and having a second diameter W2 smaller than the first diameter W1.

A first electrode terminal 125*b* is formed on the outer circumferential surface of the first connection part 125*a*, and a second electrode terminal 126*b* is formed on the outer circumferential surface of the second connection part 126*a*.

Further, each of the recesses of the base member 200 includes a first hole 225*a* having a third diameter W3 and a second hole 226*a* formed within the first hole 225*a* and having a fourth diameter W4 smaller than the third diameter W3. A third electrode terminal 225*b* is formed on the inner wall of the first hole 225*a*, and a fourth electrode terminal 226*b* is formed on the inner wall of the second hole 226*a*.

The electronic module is electrically connected to the third electrode terminal 225*b* and the fourth electrode terminal 226*b*.

Therefore, the lighting block 100 and the base member 200 are electrically connected by inserting the rod parts 110 and 120 of the lighting block 100 into the recesses of the base member 200.

Further, only the first rod part 110 of the lighting block 100 may be electrically connected to the substrate, and in this case, only the first rod part 110 is electrically connected to the corresponding recess 211 into which the first rod part 110 is inserted and power of the electronic module 270 may be supplied to the LEDs 103 through the first rod part 110 and the corresponding recess 211.

Here, the second rod part 120 of the lighting block 100 functions as a support member to fix the position of the lighting block 100, and is preferably made of an insulating material.

When one rod part 110 of the lighting block 100 is inserted into one recess of the base member 200, the lighting block 100 is electrically connected to the base member 200.

Therefore, as shown in FIG. 11, one rod part 121*a* out of two rod parts 121*a* and 121*b* formed on a lighting block 100 serves to electrically connect the lighting block 100 to the base member 200 and the other rod part 121*b* serves to stably fix the lighting block 100 when the lighting block 100 is mounted on the base member 200.

Therefore, the lighting block 100 may be freely inserted into the base member 200 regardless of position and direction, thereby creating an aesthetically pleasing appearance of the lighting apparatus according to user's preferences.

With reference to FIG. 10, when the rod part of the lighting block 100 is inserted into the recess of the base member 200, the first electrode terminal 125*b* formed on the outer circumferential surface of the first connection part 125*a* of the lighting block 100 contacts the third electrode terminal 225*b* formed on the inner wall of the first hole 225*a* of the base member 200.

Further, the second electrode terminal 126*b* formed on the outer circumferential surface of the second connection part 126*a* of the lighting block 100 contacts the fourth electrode terminal 226*b* formed on the inner wall of the second hole 226*a* of the base member 200.

Thus, the first electrode terminal 125*b* does not contact the fourth electrode terminal 226*b* and the second electrode terminal 126*b* does not contact the third electrode terminal 225*b*, thereby preventing generation of shorts.

Figure 12:
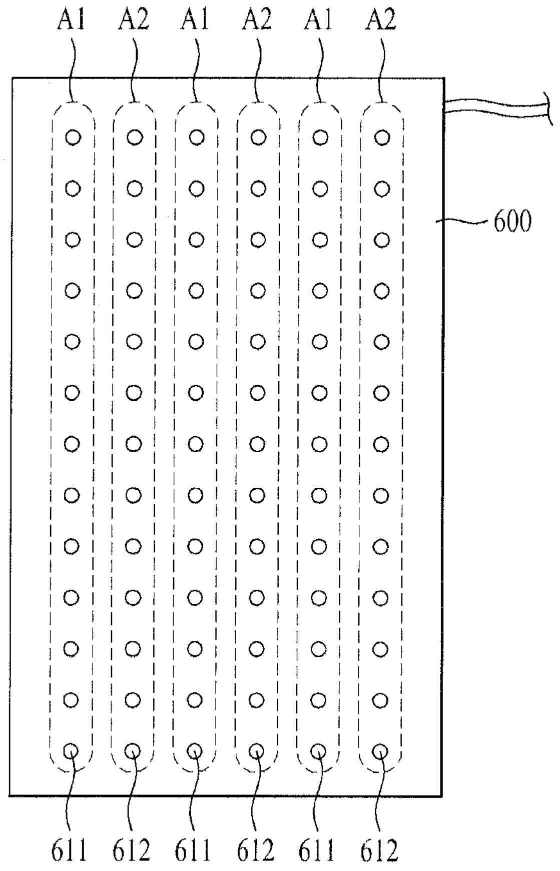
FIG. 12 is a plan view of a base member of a lighting apparatus in accordance with a second embodiment of the present invention.
Figure 13:
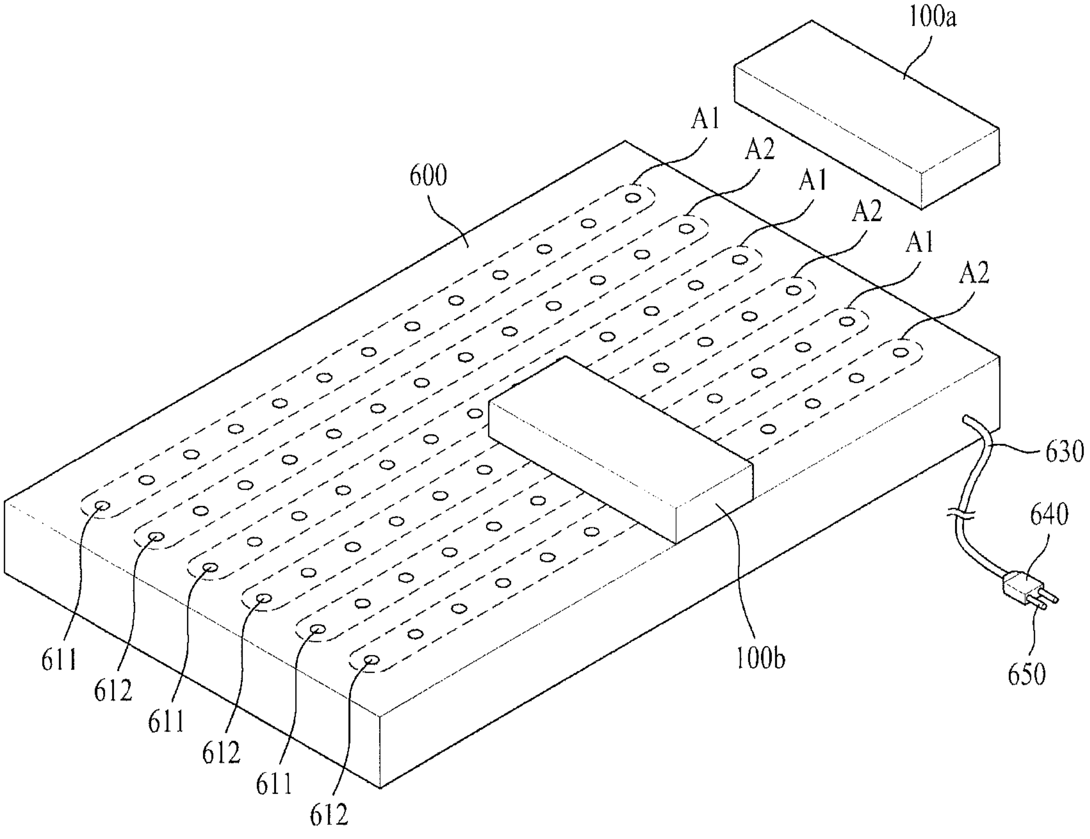
FIG. 13 is a perspective view of the lighting apparatus in accordance with the second embodiment of the present invention.

FIG. 12 is a plan view of a base member of a lighting apparatus in accordance with a second embodiment of the present invention, and FIG. 13 is a perspective view of the lighting apparatus in accordance with the second embodiment of the present invention.

A lighting apparatus in accordance with this embodiment of the present invention includes at least one lighting block (here, lighting blocks 100*a* and 100*b*) having first and second receptacles, and a base member 600 including a plurality of first and second connectors 611 and 612 detachably and electrically connected with the receptacles 100*a* and 100*b* and an electronic module to supply power to the lighting blocks 100*a* and 100*b* through the receptacles and the connectors 611 and 612 under the condition that the receptacles 100*a* and 100*b* and the corresponding connectors are respectively connected.

In the above-described lighting apparatus in accordance with the first embodiment, one rod part 121*a* of the two rod parts 121*a* and 121*b* formed on the lighting block 100 serves to electrically connect the lighting block 100 to the base member 200 and the other rod part 121*b* serves to stably fix the lighting block 100 when the lighting block 100 is mounted on the base member 200.

Therefore, the lighting block 100 in accordance with the first embodiment may be freely inserted into the base member 200 regardless of position and direction, thereby creating an aesthetically pleasing appearance of the lighting apparatus according to user's preferences.

On the other hand, in the lighting apparatus in accordance with the second embodiment, the respective receptacles 110 and 120 (with reference to FIG. 1) are electrically connected to the first and second connectors 611 and 612, respectively.

That is, the respective receptacles are electrically connected to substrates of the lighting blocks 100*a* and 100*b* and supply power to LEDs of the lighting blocks 100*a* and 100*b*.

The lighting apparatus in accordance with the second embodiment may further include an adapter installed within the base member 600 and electrically connected to the electronic module and a plug 640 electrically connected to the adapter, in the same manner as the lighting apparatus in accordance with the first embodiment.

The plug 640 is connected to the base member 600 through a cable 630.

A pin 650 of the plug 640 is inserted into a socket 310 of a commercial power source 300, and power is supplied to the electronic module of the lighting apparatus through the pin 650.

The first and second connectors 611 and 612 may be alternately arranged on one surface of the base member 600 in the horizontal direction or the vertical direction, and the respective connectors 611 and 612 may be formed in lines or columns A1 and A2.

As described above, in the lighting apparatus in accordance with the second embodiment, the first and second connectors are electrically connected to the respective receptacles. Therefore, the lighting blocks in accordance with the second embodiment cannot be inserted into the base member at desired positions in desired directions, in the same manner as the first embodiment, and may be inserted into the base member so as to coincide with a pattern of the first and second connectors.

As described above, a lighting apparatus in accordance with one embodiment of the present invention allows a plurality of lighting blocks to be inserted into a base member at positions desired by a user, thereby improving the aesthetics of the lighting apparatus.

Further, in the lighting apparatus in accordance with the embodiment of the present invention, the lighting blocks can be easily repaired and replaced.

Moreover, the lighting apparatus in accordance with the embodiment of the present invention is implemented by inserting the plural lighting blocks into the base member in the same manner as Lego blocks.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lighting apparatus comprising:

at least one lighting block having a housing and receptacles; and a base member including a plurality of connectors detachably and electrically connected with the receptacles and an electronic module to supply power to the at least one lighting block through one receptacle and one connector under the condition that the corresponding receptacle and connector are connected, wherein the connectors include recesses and the receptacles include rods protruded to outside of the housing so as to be inserted into the recesses, wherein each of the rods of the receptacles includes a first connection part having a first diameter and a second connection part extended from the first connection part and having a second diameter, and each of the recesses of the connectors includes a first hole having a third diameter and a second hole formed within the first hole and having a fourth diameter, and wherein a first electrode terminal is formed on an outer circumferential surface of the first connection part and a second electrode terminal is formed on an outer circumferential surface of the second connection part, a third electrode terminal is formed on an inner wall of the first hole and a fourth electrode terminal is formed on an inner wall of the second hole, and the electronic module is electrically connected to the third electrode terminal and the fourth electrode terminal.

2. The lighting apparatus according to claim 1, wherein the connectors are provided at designated intervals on one surface of the base member in the horizontal direction or the vertical direction.

3. The lighting apparatus according to claim 1, wherein:

each of the at least one lighting block includes the housing, a substrate disposed within the housing and at least one light emitting diode (LED) mounted on the substrate; and the receptacles are electrically connected to the substrate.

4. The lighting apparatus according to claim 1, wherein the second diameter is smaller than the first diameter, and the fourth diameter is smaller than the third diameter.

5. The lighting apparatus according to claim 1, further comprising an adapter located at a position separated from the base member by a designated interval and electrically connected to the electronic module.

6. The lighting apparatus according to claim 5, further comprising a plug electrically connected to the adapter.

7. A lighting apparatus comprising:

at least one lighting block having receptacles; and a base member including a plurality of connectors detachably and electrically connected with the receptacles and an electronic module to supply power to the at least one lighting block through one receptacle and one connector under the condition that the corresponding receptacle and connector are connected, wherein each of the at least one lighting block includes a housing, a substrate disposed within the housing and at least one light emitting diode (LED) mounted on the substrate, the receptacles include a first rod and a second rod protruded to outside of the housing so as to be inserted into recesses, and the first rod is electrically connected to the substrate, wherein each of the first and second rods of the receptacles includes a first connection part having a first diameter and a second connection part extended from the first connection part and having a second diameter smaller than the first diameter, and each of the recesses of the connectors includes a first hole having a third diameter and a second hole formed within the first hole and having a fourth diameter smaller than the third diameter, and wherein a first electrode terminal is formed on an outer circumferential surface of the first connection part of the first rod and a second electrode terminal is formed on an outer circumferential surface of the second connection part of the first rod, a third electrode terminal is formed on an inner wall of the first hole and a fourth electrode terminal is formed on an inner wall of the second hole, and the electronic module is electrically connected to the third electrode terminal and the fourth electrode terminal.

8. The lighting apparatus according to claim 1, wherein the first electrode terminal and the second electrode terminal do not contact each other, the third electrode terminal and the fourth electrode terminal do not contact each other, and the first electrode terminal and the fourth electrode terminal do not contact each other.

9. The lighting apparatus according to claim 7, wherein the first electrode terminal and the second electrode terminal do not contact each other, the third electrode terminal and the fourth electrode terminal do not contact each other, and the first electrode terminal and the fourth electrode terminal do not contact each other.

* * * * *